Figure 1:
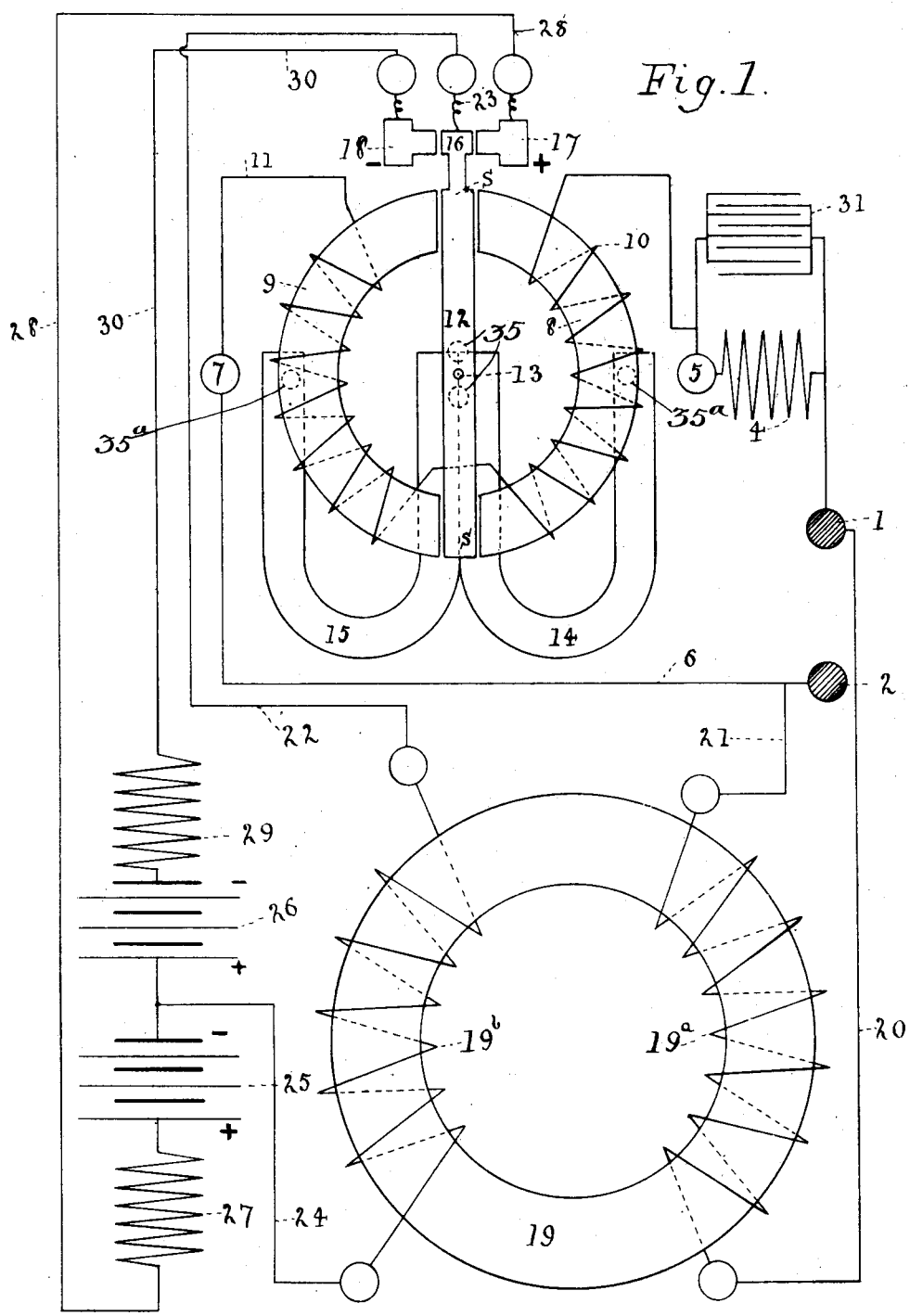

No. 711,276. Patented Oct. 14, 1902.
G. B. BATTEN.
APPARATUS FOR RECTIFYING ELECTRIC CURRENTS.
(Application filed June 29, 1901.)

(No Model.) 2 Sheets—Sheet 1.

WITNESSES: INVENTOR:
George Beckett Batten,
By his Attorneys

No. 711,276. Patented Oct. 14, 1902.
G. B. BATTEN.
APPARATUS FOR RECTIFYING ELECTRIC CURRENTS.
(Application filed June 29, 1901.)
(No Model.) 2 Sheets—Sheet 2.
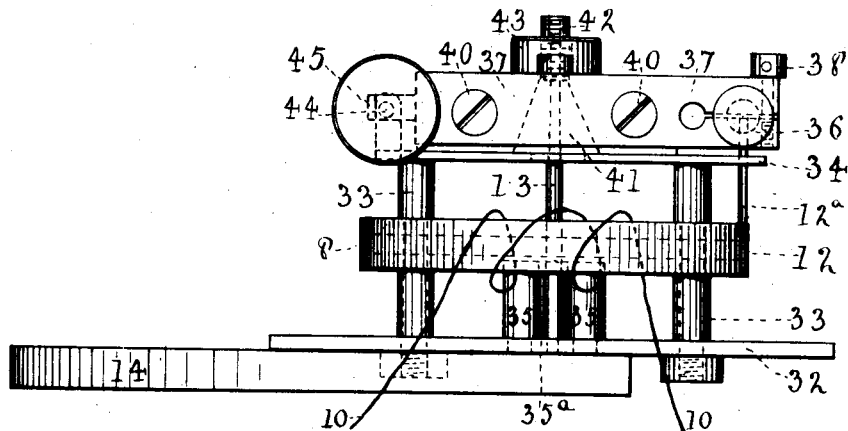
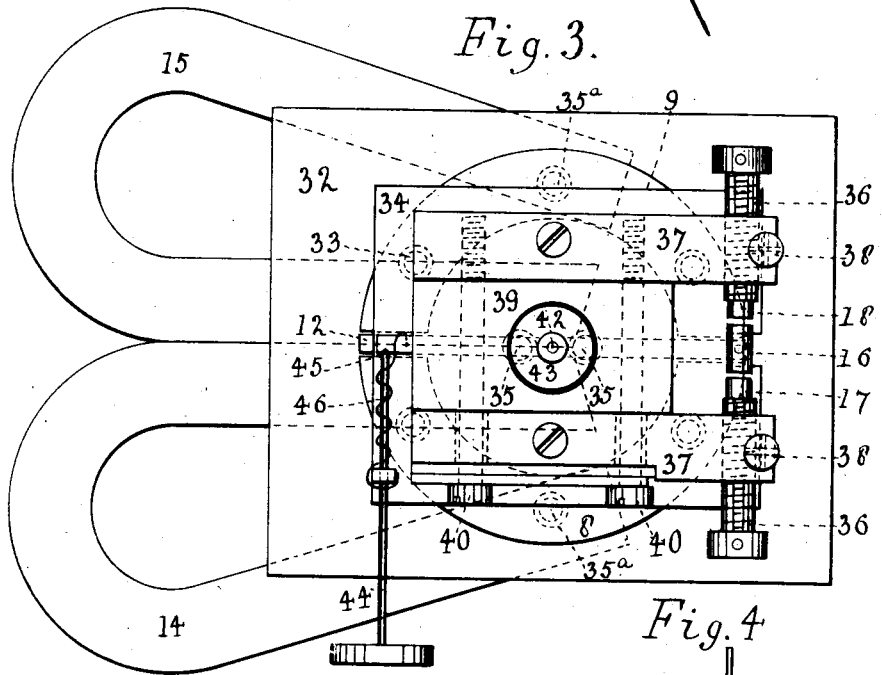
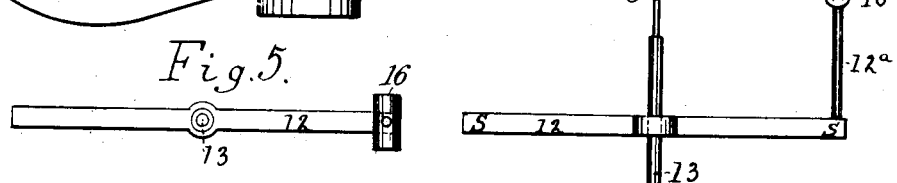
WITNESSES:
Fred White
Thomas F Wallace
INVENTOR:
George Beckett Batten,
By his attorneys

UNITED STATES PATENT OFFICE.

GEORGE BECKETT BATTEN, OF DULWICH, ENGLAND.

APPARATUS FOR RECTIFYING ELECTRIC CURRENTS.

SPECIFICATION forming part of Letters Patent No. 711,276, dated October 14, 1902.

Application filed June 29, 1901. Serial No. 66,488. (No model.)

*To all whom it may concern:*

Be it known that I, GEORGE BECKETT BATTEN, doctor of medicine, of 2 Underhill road, Lordship Lane, Dulwich, in the county of Surrey, England, have invented certain new and useful Improvements in Apparatus for Rectifying Electric Currents, of which the following is a specification.

This invention relates to apparatus for rectifying electric currents.

The apparatus consists of a vibrating tongue or reed made to vibrate in unison with the alternation of the source of power used. The alternating currents are led through electromagnetic coils, changing the polarity of their cores as the direction of the current changes. A magnet pivoted near the terminals of the cores has its opposite poles alternately attracted and repelled by the alternating magnetism of the cores, thus causing a rocking motion of the magnet about its pivot. Attached to this rocking magnet is a tongue which makes electrical contact alternately with stops or contact-pieces, against which it bears at either end of its excursion. It thus occurs that a current in one direction will cause the magnet to rock to one side, carrying the tongue against one stop, when the tongue, which is permanently connected to one of the alternating mains, gives a charge of electricity to that stop of a similar polarity to that borne by the alternating current at that instant in that main. When the current reverses, the tongue is made to travel over to the other stop, which receives a charge of electricity of opposite polarity to that received by the first stop. The tongue therefore singles out and transfers to the respective stops impulses of current that are unidirectional for each stop. If now one of the stops is connected through the primary of a spark-coil or an accumulator or other electrical circuit to the other alternating main, a unidirectional current will flow through that circuit either in a positive or negative direction, according to the stop selected. While working a spark-coil by the current from one of the stops this apparatus can also be used when suitably connected as the interrupter to that coil. By the use of this apparatus two spark-coils can so be worked, or one coil can be used off one stop and accumulators charged or other work done by the current from the other stop simultaneously, or either operation can be conducted singly. In fact, these unidirectional currents can be used for any purposes or to work any appliance or appliances which can be worked by interrupted unidirectional currents.

In the accompanying drawings, Figure 1 is a diagrammatic representation of the improved apparatus. Figs. 2 and 3 are respectively a side elevation and a plan of a practical arrangement and construction of the novel and essential parts of the apparatus shown in Fig. 1, and Figs. 4 and 5 are similar views of the armature shown in Figs. 2 and 3.

In the preceding figures the parts having the same function are indicated by the same references.

Referring first to Fig. 1, 1 and 2 are the terminals of the conductors conveying alternating currents from any suitable source. From the terminal 1 a conductor 3 leads through any suitable resistance 4, such as a lamp, to a terminal 5. The terminal 2 is connected by a conductor 6 to a terminal 7. 8 and 9 are two electromagnets of semicircular form energized, respectively, by wires 10 and 11 from the terminals 5 7. These electromagnets are arranged with their ends facing one another and separated by narrow gaps in which an armature 12, pivoted at 13, is free to oscillate from side to side on its pivot. The armature 12 is polarized by means of two permanent magnets or permanently-excited unidirectional electromagnets 14 15, which have similar poles—say S poles—at their adjacent ends that touch each other below the pivot of the armature 12. By means of soft-iron studs 35 and 35$^a$, hereinafter referred to, the magnetism of these permanent magnets passes up through the armature 12 and induces "consequent" poles—say N poles—at the center of the latter, so that both the outer ends of the armature become, say, S poles, and these poles remain always of the same sign, (marked S in the figure.) This arrangement gives the electromagnets a greater leverage on the armature. The permanent magnets 14 15 are entirely independent of and separate from the electromagnets 8 9, so that the reversals of magnetism produced in the latter cannot affect the permanent magnetism of the magnets 14 15. 16 is a contact-tongue projecting from and electrically connected to the armature 12. 17 and 18 are two contact-pieces arranged, respectively, on either side of the tongue 16 and at a distance from the latter such that the oscillation of the armature 12 will cause the tongue 16 to bear alternately against one and the other. The passage of an alternating current through the electromagnets 8 9 will produce alternating magnetism in their ends, so that the latter alternately attract and repel the two ends S S of the armature, which will therefore oscillate between the ends or poles of the electromagnets synchronously with the alternations of the current. Consequently whenever current is passing through the electromagnets in one direction—say in the positive direction—the armature will always be attracted to the same side and its tongue 16 will make contact with the positive (+) piece 17. Then during the next alternation, when the direction of the current is in the negative (−) direction, the armature will be attracted to the other side and the tongue 16 will make contact with the negative (−) piece 18. If now the tongue 16 be connected to one main and the two contact-pieces 17 18 be connected by separate circuits to the other main, then the circuit connected with the piece 17 will always get current impulses in one direction only—say the positive (+) direction—and the circuit connected with the piece 18 will always get current impulses in the other or negative (−) direction. In this manner the original alternating current is divided into two unidirectional or direct interrupted currents of half the voltage of the original current and each of which is composed of a series of separate impulses passing in the same direction through its respective circuit. It is to be understood that the make and break of the circuits between 16 and 17 and 16 and 18 can be effected by any suitable means, such as mercury-cups or any other convenient types of contact devices. The diagram also illustrates an arrangement for utilizing these currents to charge accumulators at any desired lower voltage through a suitable transformer. For this purpose the terminals of the primary winding 19ª of the transformer 19 are connected to the terminals 1 and 2 by conductors 20 21, and one terminal of the secondary winding 19ᵇ is connected by a conductor 22 through a suitable flexible connecting-wire 23 to the tongue 16 of the armature 12. The other terminal of the secondary 19ᵇ is connected by a conductor 24 to the neutral or center point of a set of accumulator-batteries 25 26. The outer end of the accumulators 25 is connected through a resistance 27 (which may be a lamp) and a conductor 28 to the positive (+) contact-piece 17. The corresponding end of the accumulators 26 is similarly connected through a resistance 29 (which may be a lamp) and a conductor 30 to the negative (−) contact-piece 18. By this arrangement the accumulators 25 are charged with a current in the positive direction and the accumulators 26 are charged with a current in the negative direction, the voltage of each of said currents being one-half of the voltage of the current passing through the secondary of the transformer after allowing for losses through resistances, &c. Theoretically the tongue 16 of the armature should make contact with each of the contact-pieces 17 18 at the moment when the current impulse is of neutral potential—that is to say, when it is changing to positive or negative from zero—whereby sparking would be entirely avoided; but in practice the contact between the tongue 16 and the pieces 17 18 will take place at a point beyond the neutral line in each case, and it is desirable to reduce this overstepping of the neutral line as much as possible. This may be done either by accelerating the phase of the current that drives the armature—i. e., that circulates through the windings of the electromagnets 8 9—such as by the use of a condenser 31, preferably connected across the terminals of the resistance 4, or by retarding the phase of the main current that is passing through the tongue 16 by the use of a step-down transformer, such as 19, or, as is shown in Fig. 1, by the use of both means.

In the practical arrangement shown in Figs. 2 to 5 the permanent magnets or permanently-excited unidirectional electromagnets 14 15, of horseshoe form, are fixed to the under side of a brass base-plate 32, which carries, by means of four pillars 33, an upper plate 34. The electromagnets 8 and 9 are constituted by laminated soft-iron plates divided into two halves by a gap in which the soft-iron armature 12 can oscillate from side to side. A fine wire 10, through which a current from the alternating-current mains passes, is wound on the electromagnets 8 9. The soft-iron armature 12 is fixed on an arbor 13, which pivots at top and bottom in the plates 34 32. A magnetic circuit of practically minimum magnetic resistance is formed between the armature 12 and the permanent magnets 14 15 by means of soft-iron studs 35 35ª, fixed in the plate 32. The tongue 16 is mounted on an arm 12ª, forming part of the armature 12, (see Figs. 4 and 5,) and is arranged so as to oscillate between the two contact-pieces 17 18, which are rendered adjustable by being formed on the screws 36 36, working in brass blocks 37 37. 38 38 are set-screws for clamping the screws 36 in position when adjusted. 39 is a block of ebonite or other suitable insulating material, to which the blocks 37 are fastened by means of screws 40 40, suitably insulated by means of ebonite or other material. 41 is a conical plug riveted into the plate 34 and having in it the hole for the top pivot of the arbor 13 of the armature 12. The plug 41 is also formed with a screw-threaded stem 42, on which a nut 43 can be tightened up so as to clamp the ebonite block 39 in any desired position on the plug 41. The ebonite block 39 can be rotated for the purposes of adjustment through the medium of a screw 44, working against an abutment 45 and opposed by a spring 46. This device serves to regulate the bias of the armature 12. This regulation may also be effected by reversing the arrangement—namely, by making the contacts stationary and rotating the cores of the electromagnets.

In a modification the armature polarized by permanent magnet or magnets may be arranged to rotate and the unidirectional current impulses may be conveyed to a circuit by means of revolving brushes.

The brass blocks 37 37 may (in an amplification of this apparatus) be rigidly connected to the base-plate 32 or to the top plate 34, being kept from metallic contact by ebonite bushings to the screws by which they are secured, the office of the block of ebonite 39 being performed by adjusting the magnetic bias of the tongue by means of the screws 36 36.

What I claim, and desire to secure by Letters Patent, is—

1. In apparatus for rectifying electric currents, the combination of a movable polarized soft-iron armature having consequent poles of constant polarity, a permanent magnet inducing said consequent poles in said armature, a contact-piece carried by said armature and forming part of a circuit carrying an alternating current, and an electromagnet adapted to be energized by the said alternating current to alternately attract and repel both ends of said armature whereby said armature is caused to make and break contact alternately with said external-circuit contacts synchronously with the alternations of said alternating current, substantially as set forth.

2. In apparatus for rectifying electric currents, the combination of a movable polarized armature of constant polarity, a contact-piece carried by said armature and forming part of a circuit carrying an alternating current, two external-circuit contacts forming parts of different external circuits and located one on each side of said armature, with which said armature can make and break contact alternately in its movement, and an electromagnet adapted to be energized by said alternating current to cause said armature to move synchronously with the alternations of said alternating current, so as to make and break contact alternately with said external-circuit contacts, whereby the differently-directed impulses of said alternating current are delivered respectively into the two different external circuits, substantially as set forth.

3. In apparatus for rectifying electric currents, the combination of a movable polarized armature of constant polarity, an electromagnet adapted to be energized by an alternating current to alternately attract and repel said armature synchronously with the alternations of said alternating current, and a transformer having its primary winding connected in parallel with the energizing-coils of the said electromagnet to the same alternating-current source, and also having its secondary winding electrically connected to said armature, whereby the lag in phase of the electromotive force of the secondary current behind the phase of the electromotive force of the primary current is utilized to compensate for the mechanical inertia of the armature, substantially as set forth.

4. In apparatus for rectifying electric currents, the combination of a pivoted polarized soft-iron armature of constant polarity, a permanent magnet for inducing constant polarity in said armature, an electromagnet having a soft-iron core for causing said armature to move on its pivot, and soft-iron studs providing a low-resistance magnetic path between said armature and said core and said permanent magnet, whereby the magnetic flux emanating from said permanent magnet is conveyed by said studs through said armature and said core with minimum practical loss, substantially as set forth.

5. In apparatus for rectifying electric currents, the combination of a movable polarized armature of constant polarity, a contact-piece carried by said armature and forming part of a circuit carrying an alternating current, a plurality of contacts with which said armature can make and break contact alternately in its motion, an electromagnet adapted to be energized by said alternating current to alternately attract and repel said armature to and from said contacts, a resistance inserted in the energizing-circuit of said electromagnet, and a condenser connected across the terminals of said resistance, whereby the make and break of said armature with said contacts is adjusted to occur as nearly as possible to the period of least potential of said alternating current, substantially as set forth.

6. In apparatus for rectifying electric currents, the combination of a movable armature, an electromagnet adapted to alternately attract and repel said armature, and having its core built up of soft-iron laminations separated at diametrically opposite points whereby magnetic gaps are formed in which the armature is movable, substantially as set forth.

7. In apparatus for rectifying electric currents, the combination of a pivoted polarized soft-iron armature of constant polarity, a permanent magnet for inducing constant polarity in said armature, an electromagnet having magnetic fields in which said armature is movable, and having a winding forming part of a shunt-circuit from a main circuit carrying an alternating current, a transformer having its primary in the said main circuit and having its secondary connected at one end to the said contact-piece, a set of storage batteries connected at its neutral point to the other end of the said secondary, a contact arranged on one side of said contact-piece, and connected at one of the outer terminals of the said set of storage batteries, and a contact arranged on the other side of the contact-piece and connected to the other outer terminal of the said set of storage batteries, substantially as set forth.

In witness whereof I have hereunto signed my name in the presence of two subscribing witnesses.

GEORGE BECKETT BATTEN.

Witnesses:
GEORGE C. BACON,
THOMAS L. WHITEHEAD.